(12) United States Patent
Shintani et al.

(10) Patent No.: US 6,783,832 B2
(45) Date of Patent: Aug. 31, 2004

(54) INFORMATION RECORDING MEDIUM

(75) Inventors: Toshimichi Shintani, Kodaira (JP); Motoyasu Terao, Hinode (JP); Keikichi Andoo, Musashino (JP)

(73) Assignee: Hitachi, Ltd., Tokyo (JP)

(*) Notice: Subject to any disclaimer, the term of this patent is extended or adjusted under 35 U.S.C. 154(b) by 25 days.

(21) Appl. No.: 10/073,014

(22) Filed: Feb. 12, 2002

(65) Prior Publication Data

US 2003/0039200 A1 Feb. 27, 2003

(30) Foreign Application Priority Data

Aug. 7, 2001 (JP) ........................ 2001-238686

(51) Int. Cl.⁷ ................................ B32B 3/02
(52) U.S. Cl. ............... 428/64.4; 428/64.2; 428/64.8; 428/65.3; 428/65.7; 428/694 GT
(58) Field of Search .................. 428/64.2, 64.4, 428/64.8, 65.3, 65.7, 692, 694 XS, 694 GT (56) References Cited

U.S. PATENT DOCUMENTS

| | | | | |
|---|---|---|---|---|
| 4,839,226 A | * | 6/1989 | Sawada et al. | ............ 428/336 |
| 5,738,973 A | * | 4/1998 | Abe | ............ 430/270.11 |
| 5,764,619 A | * | 6/1998 | Nishiuchi et al. | ........ 369/275.1 |
| 6,329,035 B1 | * | 12/2001 | Iwasaki et al. | ............ 428/64.1 |
| 6,385,162 B1 | * | 5/2002 | Nagase et al. | ............ 369/288 |

FOREIGN PATENT DOCUMENTS

JP  5-217206  8/1993  ............ G11B/7/24

OTHER PUBLICATIONS

Patent Abstracts of Japan 05–217206 Aug. 27, 1993.
Ken'ichi Nagata, et al., "Rewritable Dual–Layer Phase–Change Optical Disk", Jpn. J. Appl. Phys. vol. 38(1999) Pt. 1, No. 3B, Mar. 1999, pp. 1679–1686.
Kouichi Yasuda, et al., "Premastered Optical Disk By Super-resolution", Jpn. J. Appl. Phys. vol. 32(1993), pp. 5210–5213, Part 1, No. 11B, Nov. 1993.

* cited by examiner

Primary Examiner—Archene Turner
Assistant Examiner—G. Blackwell-Rudasill
(74) Attorney, Agent, or Firm—Antonelli, Terry, Stout & Kraus, LLP

(57) ABSTRACT

A multilayered optical disk having n recording layers is designed in such a manner that the transmittance $T_i$ of the $i^{th}$ layer from a light-incident side satisfies the relationship:

$$\prod_{i=1}^{j-1} T_i^2 \geq \frac{n-j+l}{n}$$

when the light is focused on a recording film of the $j^{th}$ layer. By doing so, the recording/reading property of a multilayered medium is improved.

19 Claims, 5 Drawing Sheets

301: SUBSTRATE

FIG.3B

302: REFLECTIVE FILM
303: PROTECTIVE LAYER·RECORDING FILM

FIG.3C

304: RESIN FOR THE SPACER LAYER

305: NONLINEAR OPTICAL FILM
303: PROTECTIVE LAYER·RECORDING FILM

FIG.3F

306: RESIN FOR GLUING THE SHEET

FIG.3G

307: 0.1mm SHEET

INFORMATION RECORDING MEDIUM

BACKGROUND OF THE INVENTION

The present invention relates to an optical information recording medium for recording and/or reading information optically; and, more particularly, the invention relates to a multi-layered optical disk having an improved recoding/reading accuracy.

One way to achieve an optical disc having a high capacity is by use of a multilayered medium having plural laminated information recording layers. As a read-only disk, a dual-layered DVD-ROM has been proposed. As for a rewritable dual-layered medium, the Japanese Journal of Applied Physics, Vol. 38, pp. 1679 to 1686 (1999), introduces such a technique therein, for example. In these techniques, recording layers are built up with an interval of several 10 $\mu$m, and recording/reading of information is effected by focusing optical spots onto each layer. Information on a side opposite that which receives the incident light is recorded/read as the light passes through the layer on the side of the incident light. When reading information from an inner layer, the light passes through the layers on the side of the incident light twice.

These techniques can increase the recording capacity of a medium of the same size to about twice.

JP-A-21720-1993 discloses a triple-layered recordable medium using a high transmittance organic recording film. In accordance with this method, the transmittances of the three layers are 70%, 80% and 90%, respectively, and the transmittance of a recording mark thereof is 100%. By detecting the amount of transmitting light, data recorded on the three layers are read at the same time. The method is capable to increasing the recording density and data transfer rate by about three times.

As for an optical disk using a nonlinear optical layer, a method of photon super-resolution has been proposed. Several methods using this technique have been proposed, and the Japanese Journal of Applied Physics, Vol. 32, p. 5210, discloses one of them, for example. The described method is characterized in that, by providing a mask to block a part of the optical spot so as to transmit light only through an unmasked portion thereof, the effective spot diameter is reduced, thus increasing the density and capacity of the optical disk. Specifically, in the process of photon super-resolution, when the light focuses on a film, the light transmittance of the light of higher intensity is increased, whereas the reflectance of the non-focused portion is high. In known techniques based on the use of photon super-resolution, a medium has reflective films, and the transmittance of the medium itself is always substantially 0%.

The abovementioned techniques, however, have some inherent problems. In recordable and rewritable optical disks, in particular, it is difficult to form a dual-layered medium that secures a satisfactory process margin in consideration of mass productivity and the products or margins for recording/reading conditions. This is because it is difficult to achieve an optimum optical design that allows for high signal modulation in both layers. To increase the signal quality obtained from the light-incident side, the transmittance of the layer should be lowered, and it is better to increase the reflectance and create larger differences in reflectance between a marked portion and a spaced portion. On the other hand, however, for the layer of the farthest side, the higher the transmittance of the layer on the light incident side is, the higher will be the signals that can be received. As such, as for setting the transmittance of the light incident side layer, the signal needs to be shared by two layers, because the optimum transmittance is in conflict for both layers. More details thereof will be described hereinbelow.

Hereinbelow, a dual-layered phase change medium will be described in which L0 denotes a layer on the side facing the incident light, L1 denotes a layer on the other side side thereof, Rc denotes the disk reflectance of a crystal state, and Ra denotes the amorphous state thereof. Rc and Ra of layers L0 and L1 are indicated respectively as Rc0, Ra0, Rc1, and Ra1. The amount of reflected light/incident light, i.e., the drive reflectance, is indicated as Rcd and Rad, and the transmittance of layer L0 is indicated as T0.

Suppose T0=60% and (Rcd, Rad)=(15%, 2%). The reflectance takes on values close to the reflectance of a phase change disk that is currently produced. It is desirable to obtain the same amount of signal from layers L0 and L1. Calculating reflectance, while taking the above into consideration, a setting value for the reflectance of the layer L1 is (Rc1,Ra1)=(41.7%, 5.6%). However, it is difficult to design a disk for a phase change medium that is capable of overwriting that has a reflectance of 40% or higher. If T0 is set higher than 60%, the reflectance and light absorption of the layer L0 is lowered significantly, and it becomes impossible to obtain a desirable property at the layer L0. Moreover, it is necessary that the transmittance is substantially the same in the crystalline state and the amorphous state for the following reason: when the layer L0 has a marked portion and an unmarked portion, and if the light spot passes on a border of two areas of the layer L0 as the light reads the layer L1, the direct current element and amplitude of the signal in reading the layer L1 fluctuate, thereby causing an increase in jitter or the error rate. Therefore, any accidental error of the transmittance for those two states should be suppressed to less than 5 to 10%. However, maintaining a translucent transmittance with the range is difficult when considering the processing margin.

Moreover, while a dual-layered medium generates problems, such as the above, it is almost impossible to achieve a recordable/rewritable optical disk having three or more layers. The triple-layered recordable disk technique described above detects transmittance. In this method, however, optical systems need to be located above and below the disk. Such a structure makes it difficult to adjust the optical systems, thereby lowering the production margin of the drive. Moreover, the method is not applicable to a rewritable disk.

In the super-resolution technique, the effective spot diameter can be made smaller, thus allowing for a higher density. However, the technique has drawbacks, as follows: A. When considering the processing margin for mass productivity, it is difficult to make the size of the light transmitting portion constant over the entire surface of the disk. B. In an optical disk, the signal to noise ratio S/N becomes an issue; and, in this regard, the area of an effective spot as a part of the spot diameter determines the signal level, while the spot diameter irradiating the disk determines the noise, whereby the signal is increased for a short mark, but the overall S/N, including the one for a long mark, is lowered.

SUMMARY OF THE INVENTION

In view of the above, the transmittance of the layer L0 should be high at least while reading the layer L1 in consideration of the layer L1. When reading the layer L1, a signal for reading the layer L1 is determined by a square of the transmittance of layer L0, that is, $T_0^2$. The value of the obtained signal should be no lower than a half of the signal obtained from a single layer L1, thus a desirable value is expressed as:

$$T_0^2 \geq 50\%$$

$$\therefore T_0 \geq 71\% \quad \text{EXPRESSION 1}$$

In the case of a triple-layered medium, the signals are determined by a square of the transmittance of layer L0 when reading the layer L1, i.e., $T_0^2$, and a product of the squared transmittance of layers L0 and L1, i.e., $T_0^2 T_1^2$, when reading the layer L2. In this case, each signal for reading layers L0 and L1 is desirably expressed by:

$$T_0^2 \geq 2/3 = 67\%$$

$$\therefore T_0 = \sqrt{2/3} \approx 82\% \quad \text{EXPRESSION 2}$$

$$T_0^2 T_1^2 \geq 1/3 = 33\%$$

$$\therefore T_1 = \sqrt{1/2} = 71\% \quad \text{EXPRESSION 3}$$

When the expressions are generalized, the transmittance for reading a $J^{th}$ layer of an n-layered recording medium can be expressed as:

$$\prod_{i=l}^{j-l} T_i^2 \geq \frac{n-j+l}{n} \quad \text{EXPRESSION 4}$$

where the i-layer and the j-layer used herein mean a laminated film interposed between a substrate and a spacer layer, or a laminated film interposed between a spacer layer and another spacer layer, the i-layer or the j-layer being composed of a lower protective layer, a recording layer, an upper protective layer, a nonlinear optical layer or a reflective layer.

However, as described above, it still has a high transmittance, thereby making it difficult to design the layer L0. Such a problem can be solved by producing a medium where the transmittance is lowered and the reflectance is enhanced as the light focuses thereon. Such a mechanism will be described later.

In the above-described Expression 4, the transmittance of the first layer to the j–1th layer is dealt with all together, but it is desirable to design the structure in such a manner that a signal is equally divided among respective layers. In the case of a triple-layered medium, for example, T0 and T1 fulfilling Expressions 2 and 3 are defined as:

$$T_0 \geq \sqrt{2/3}$$

$$T_1 \geq \sqrt{1/2} \quad \text{EXPRESSION 5}$$

By generalizing the expression, the transmittance Ti of the $i^{th}$ layer only needs to satisfy the following Expression 6:

$$T_i \geq \sqrt{\frac{n-i}{n-i+l}} \quad \text{EXPRESSION 6}$$

Moreover, it is possible to design a medium that will secure a processing margin if the transmittance is 50% or less when the light is focusing. In this case, signals on layers further than a light-focusing layer as seen from the light incident layers are not read, and thus, it is not necessary to consider differences in transmittance of crystal and amorphous states in such a case, as described above. The transmittance is low enough to make the design of a medium easier, while securing the processing margins.

In the present specification, the phrase "when the light is focusing" refers to a case when a light spot diameter on a film surface becomes 105% or less of the size of a minimum beam constriction of the optical system of concern. The term "spot diameter" used herein means a diameter providing an intensity of $1/e^2$ of the central intensity when the spot of the light is approximated to the gaussian distribution. When the spot diameter spreads by 5%, the central intensity is about 90%, whereby, it is considered within a margin of the mechanism described below.

A medium that changes transmittance and reflectance, as described above, can be achieved by using a substance whose optical property changes depending on the energy density of the light applied to the layer L0, i.e., by using a nonlinear optical layer. When the nonlinear optical layer is provided between the L0 recording film and L1 recording film, the nonlinear optical layer should be composed of a material that is transparent or translucent when the light is not focused on the L0 recording film, and has a higher reflectance when the optical spot focuses on the L0 recording medium, compared to a case where the light is not focused. Such a change occurs due to absorption of the light. That can be achieved by either using a photon mode or the heat generated by the light absorption. The change should occur depending on the light power density applied to the substance. In order to read the layer L1 immediately after reading the layer L0, the change has to return to an original state within a certain period of time, and the transmittance of the layer L0 has to be high again. It is desirable that it returns to normal naturally during one disk revolution, for example. If the change occurs due to heat, the temperature should return to the original during one disk revolution so as to reverse the change to the original state.

The mechanism is not only applicable to a dual-layered medium, but is also applicable to a multilayered medium having two or more layers.

Figure 1:
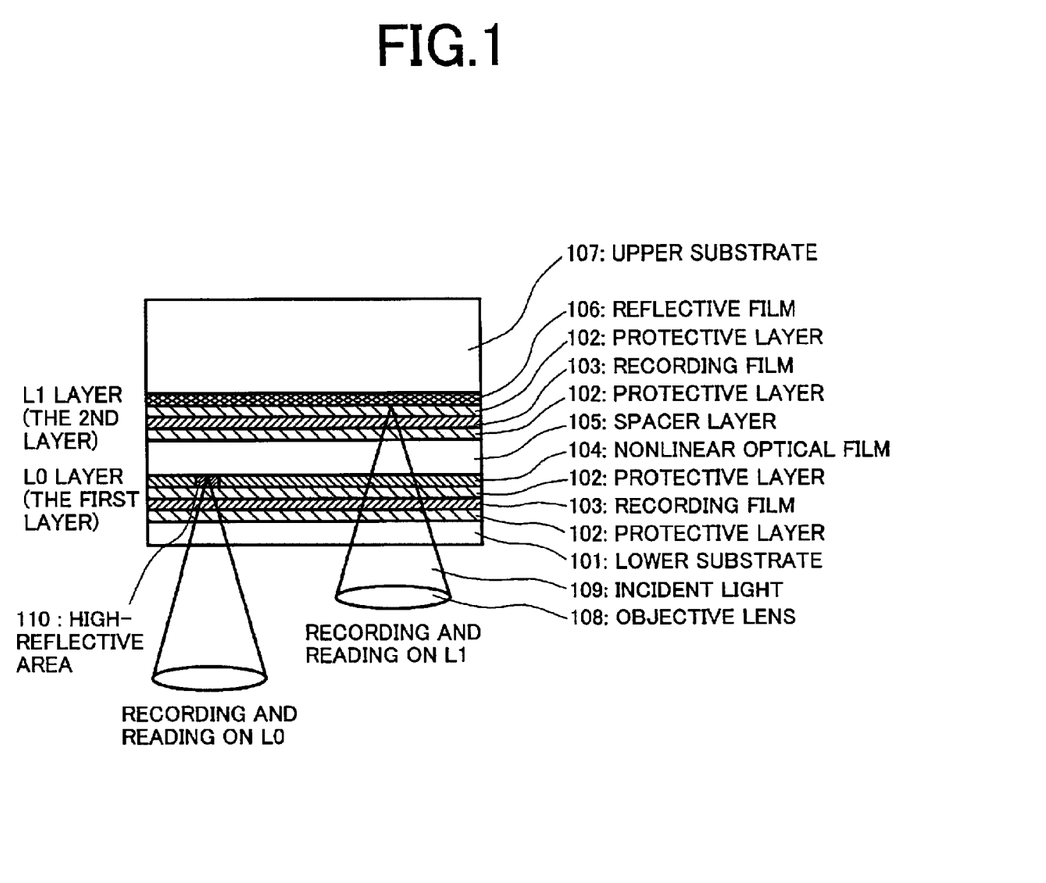
FIG. 1 is a diagram illustrating the structure of a dual-layered disk according to the present invention.

FIG. 1 illustrates the mechanism. When light of high power density does not irradiate the nonlinear optical layer 104, i.e., when there is no incident light, and when recording and reading the layer L1, the reflectance of the nonlinear optical layer 104 is low, while the transmittance thereof is high. On the other hand, when recording/reading the layer L0, a portion 110 thereof that is irradiated with light becomes metallic, thereby increasing the reflectance thereof.

The above-described object is achieved by providing a nonlinear optical layer between a first recording film (L0 layer) and a second recording film (L1 layer). The nonlinear optical layer has a property such that the transmittance thereof is higher than the reflectance when the light is not focusing, and the reflectance is higher than the transmittance when the light is focusing. The recording layers are not limited to two layers, and the structure is applicable to a multilayered recording medium having more than two recording layers.

The following materials may be used as a nonlinear optical layer: a) thermochromic material, b) transition metal oxide exhibiting a semiconductor-metal transition, c) garnet, and d) magnetic semiconductor.

The thermochromic material changes wavelength dependency of reflectance and transmittance reversibly according to the temperature. One example thereof is a material of triphernylmethane dye. A super-resolution optical disk using the aforementioned material is disclosed in the Japanese Journal of Applied Physics, Vol. 39, pp 752 to 755 (2000).

A semiconductor-metal transition is known to occur with temperature, pressure, and a compound composition ratio as its variables. In this case, a material causing the transition based on the temperature thereof is selected. Such a material may include an oxide of Ti, V, Cr, Mn, Fe, Co, Ni and Cu. The heat dependency of electronic properties of these materials is described in, for example, Solid State Physics, Vol. 21, pp 1 to 113 (1968). If the material is solely used, an optical property, such as the refractive index thereof before and after the transition, does not change much in the wavelength range of visible light used in the current optical disks. A fact regarding $VO_2$ is reported in Physical Review, Vol. 172, pp. 788 to 798 (1968). In order to solve the problem, free electrons generated in the transition metal oxide due to the transition are injected into another material A so as to change the optical response of the material A. In this case, the material that changes its optical response by the injection of an electric charge may be a metal or a semiconductor. In particular, when a semiconductor is used, an electric charge is injected into a conduction band so as to increase the number of carriers compared to that before the transition, thereby increasing the effect thereof. In order to inject the electric charges efficiently, the Fermi energy level of the material A should be smaller than the Fermi energy level of the transition metal oxide indicating the transfer. Moreover, the injection of the electric charge is conducted through an interface. Thus, the larger the area of the interface is, the easier it will be to inject the electric charge. Therefore, more electric charges can be injected if the material A and the transition metal oxide are formed in a multilayered film structure.

Figure 2:
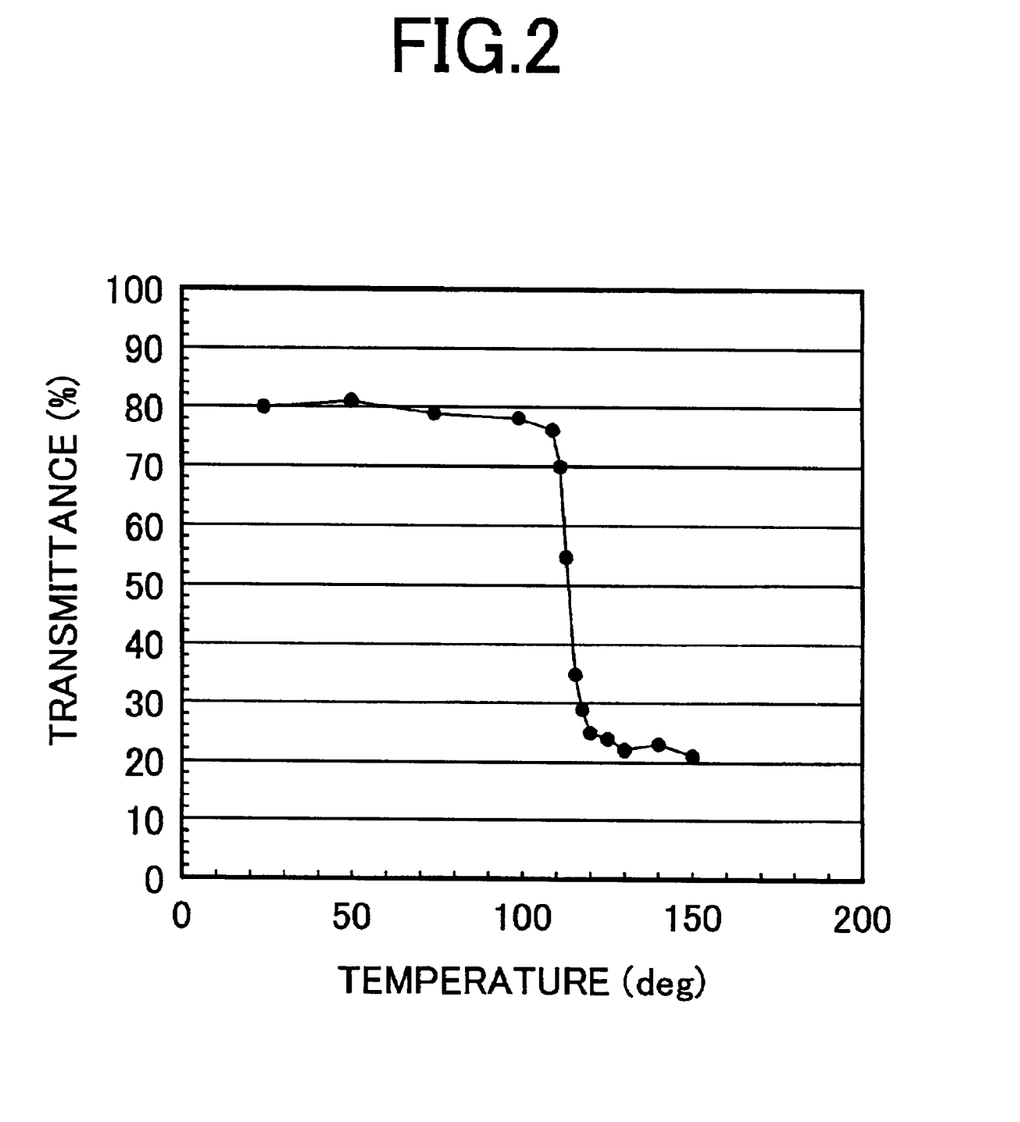
FIG. 2 is a graph showing the heat dependency of transmittance of a bulk monocrystal of garnet with GA doped therein.

Next, a case of using a magnetic material will be described. Among the magnetic materials, there is a kind of material that exhibits a magnetic transition due to heat while changing the optical property simultaneously. Garnet, in particular, exhibits a strong tendency for this change. FIG. 2 shows a temperature dependency of the transmittance of a bulk crystal of garnet having Ga doped thereinto. The wavelength of the light used herein is 400 nm. In FIG. 2, the transmittance decreases drastically at around 120° C. The Curie temperature of the material is about 120° C., and thus, a change in transmittance occurs due to the magnetic phase transition.

When a magnetic semiconductor is used, a band structure change due to the magnetic property contributes a great deal to a change of the optical property. The temperature dependency of the optical property of the magnetic semiconductor is described, for example, in Semiconductors and Semimetals, Vol. 25, pp. 35 to 72 (1988). The magnetic semiconductor of this kind includes a material described as RMnM, where R is a simple substance or mixture of Cd, Zn, Hg, and Pb, and M is O, S, Se, and Te. RMnM may be used as a simple substance, or it may be mixed with other materials in some cases.

When the above-described nonlinear optical material is applied to a multilayered disk, it is designed in such a manner that the transmittance is high when no focused light is applied, whereas it becomes low when the focused light is applied. In particular, when such material is applied to a phase change disk, a phase change recording film absorbs the light, and thus, it is desirable to design the material to have an absorption factor of substantially 0 when the transmittance thereof is high. In this case, however, it is impossible for the nonlinear optical material to indicate a transmittance change due to the light absorption. This problem can be solved by transferring heat from a film near the nonlinear optical layer that absorbs light, if the nonlinear optical material indicates a transmittance change by heat. The film for absorbing the light may be a recording film, like a phase change film, as described above, or it may be formed by laminating a film of metal or semiconductor within the disk. In order to transfer heat efficiently, the distance between the light absorbing film and the nonlinear optical material has to be shorter, and the thickness of the metal film or semiconductor therebetween needs to be from 0 nm to 50 nm.

DETAILED DESCRIPTION OF THE PREFERRED EMBODIMENTS

Embodiment 1

As a nonlinear optical layer 104 of FIG. 1, a multilayered structure of $VO_2$ and GaN is used. The laminated structure of layer L0 comprises a polycarbonate substrate of 120 mm in diameter (100 (m)/a protective layer/a recording film InSe (5 nm)/a protective layer/GaN (2 nm)/$VO_2$ (2 nm)/GaN (2 nm)/$VO_2$ (2 nm). The laminated structure of layer L1 comprises a protective layer/a recording film InSe(22 nm)/a protective layer/a reflective film (80 nm) on a 120 mm diameter polycarbonate substrate (1.1 mm). All films are formed by sputtering. A resin layer (spacer layer) of about 30 $\mu$m is arranged between layers L0 and L1. The polycarbonate substrate of 1.1 mm has grooves with a depth of about 40 nm and a width of 0.3 $\mu$m, with a pitch of 0.6 $\mu$m. Specifically, it has a land/groove structure.

Figures 3A, 3E:
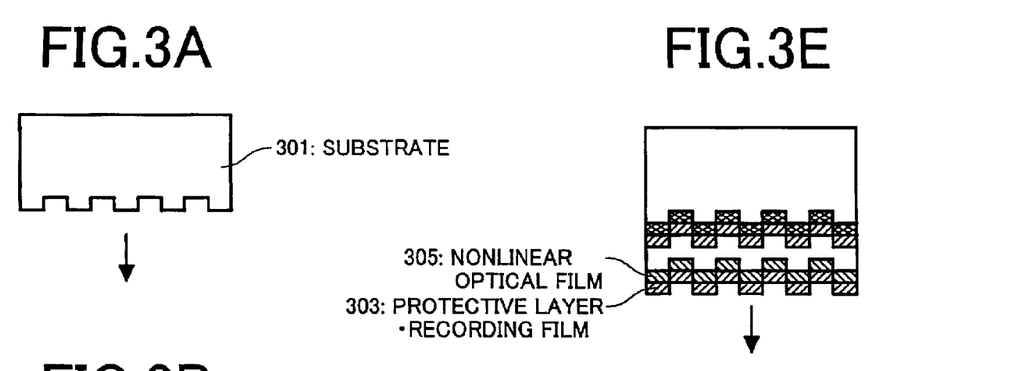
FIGS. 3A to 3G are diagrams which illustrate steps in the production of a dual-layered medium.
Figures 3B, 3C, 3D, 3F, 3G:
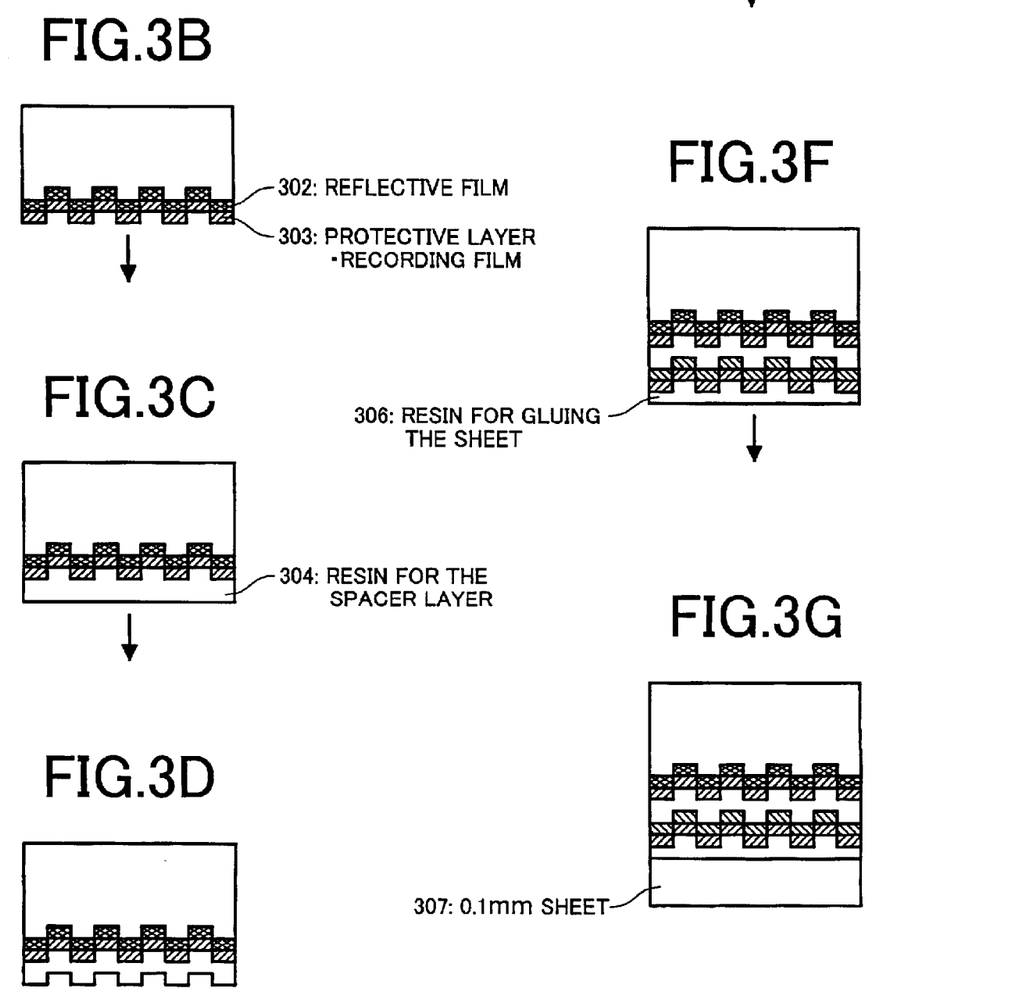

FIGS. 3A to 3G show process steps in the production of the disk in sequence. As shown in FIG. 3A, a polycarbonate substrate 301 with a thickness of 1.1 mm is provided with a land/groove structure. On top of the polycarbonate substrate 301, a reflective film 302, a protective film and recording film 303 are sputtered, as shown in FIG. 3B. Next, a resin 304 for a spacer layer is attached, and a stamper is pressed against the resin to cure the resin, as shown in FIG. 3C, so as to form a land/groove pattern for the layer L0, as shown in FIG. 3D. Thereafter, as shown in FIG. 3E, a nonlinear optical layer 305 (GaN (2 nm)/$VO_2$ (2 nm)/GaN (2 nm)/$VO_2$ (2 nm)), a protective film, and recording film 303 are sputtered. Herein, GaN is sputtered while mixing it with 1% of $N_2$ in an Ar atmosphere. $VO_2$ is sputtered by mixing 1% of $O_2$ in an Ar atmosphere by using a V target. Lastly, as shown in FIG. 3F, resin for gluing the sheet 306 is attached, and a polycarbonate sheet 307 with a thickness of 0.1 mm is then glued therewith, as shown in FIG. 3G. The disk is completed by curing the resin 305. The refractive indices of the resins 304 and 306 and the 0.1 mm sheet 307 are generally the same. The difference in the refractive indices is less than 0.1.

Figure 4:
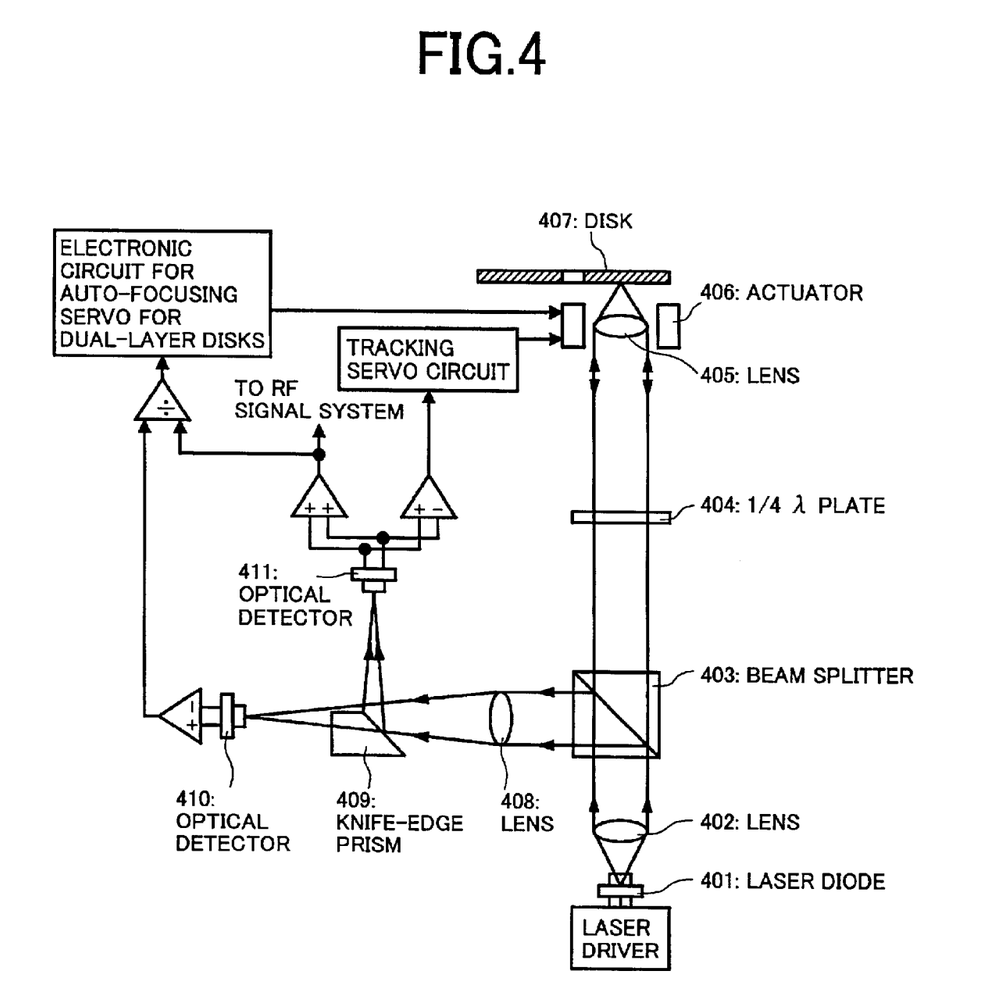
FIG. 4 is a schematic block diagram of an optical disk drive for recording and reading a multilayered disk according to the present invention.

Marks were recorded/read on this disk through an objective lens with a numerical aperture of 0.85 by light having a wavelength of 400 nm. The recording/reading drive used herein was a conventional drive, as shown in FIG. 4. A semiconductor laser 401 operating as a light source is driven by a laser driving circuit and emits a linearly polarized laser beam. The light is formed into a parallel beam by a lens 402, and it then passes though a beam splitter 403 so as to become circularly polarized light at a 1/4λ plate 404. The circularly polarized light is focused on a disk 407 by a lens 405 attached to an actuator 406. The reflective light from the disk 407 returns to the lens 405 and becomes linearly polarized light having a reverse direction of polarization from the incident light at the 1/4λ plate, so as to turn the light path in the beam splitter 403. The light passes through a lens 408 and is divided by a knife-edge prism 409. One of the divided lights enters a two-division optical detector 410 for auto-focusing servo control, and the other enters a two-division optical detector 411 for control in reading/tracking system. The ratio of the light amount splitting of the knife-edge prism is the detector 410: the detector 411=1:9.

A signal obtained by the optical detector 410 is taken as a difference signal. The difference signal is divided by a reading signal, and the result is input to an electronic circuit for auto-focusing servo control for dual-layered disks. The actuator 406 moves the lens 405 for auto-focusing. The signal input to the auto-focus servo circuit changes as the focusing point of the laser beam in the disk 407 moves, and when focused, it becomes 0. When the disk is dual layered, and the transmittance of the layer L1 is substantially 0, the light focuses on a surface of the sheet 307, the layer L0, and layer L1 because the difference in the refractive indices between the resins 304, 306 and the sheet 307 are minute. When performing auto-focusing, as the lens 405 moves closer to the disk to count the number of 0 cross points of the signal is counted, so that it is possible to identify where the laser beam focuses on the disk 407 currently. Moreover, when the laser beam focuses on the layer L0, for example, and moves to the layer L1, the lens 405 moves to the further side of the disk and stops when the next 0 cross point is detected.

A sum signal of the signal obtained by the optical detector 411 is input to an RF signal system, and a difference signal thereof in input to a tracking servo circuit as a push/pull signal. The actuator 406 moves the lens 405 so as to conduct tracking servo.

The above-described drive uses a knife-edge method for auto-focus, and a push-pull method for tracking. Alternatively, an astigmatic method may be used for focus, and a 3-beam differential push-pull method may be used for tracking, for example.

Before evaluating the dual-layered medium described above, the single layer disks having the structure of layer L0 and layer L1, respectively, will be considered for evaluation. The reflectance and transmittance of the layer L0 were measured by a spectrophotometer and it was found that the reflectance and transmittance of the crystal and amorphous states thereof, i.e., Rc, Ra, Tc, Ta, were (Rc0, Ra0, Tc0, Ta0)=(5%, 5.5%, 71%, 62%), correspondingly, and for the layer L1, (Rc1, Ra1)=(20.3% and 6.2%).

For evaluation of a dual-layered medium, the layer L0 was focused on first. The reflectance calculated from the amount of reflecting light obtained at the drive, i.e., the drive reflectance was (Rc, Ra)=(10.7%, 3%). The result was different from the value obtained by a spectrophotometer as described above because the refractive indices of $VO_2$ and GaN changed due to the semiconductor-metal transition. A laser beam pulse irradiated the layer L0 to record a mark that was 0.194 μm long with a linear velocity of 6 m/s. CNR and 50 dB were obtained. When a random pattern was recorded by using an 8–16 modulation code, the jitter was 8.5% for the first recording, and 9.3% after overwriting 1000 times.

Next, the laser beam was focused on the layer L1. The reflectance of the layer L1 was (R1c, R1a)=(10.1%, 3%). The transmittance of the layer L0 was 71% when in the crystal state, which is about a half of the reflectance of the L1 single layer observed by the spectrophotometer, since $0.71^2 \approx 50\%$, which agrees with the calculation. When marks were recorded in the layer L1 under the same recording conditions as used for the layer L0, the jitter was 8.7% for the first recording, and 9.6% after overwriting 1000 times.

Embodiment 2

As a layer 104 in FIG. 1, a mixed material of triphenyl-methane dye material and color development material is used. The laminated structure of layer L0 comprises a polycarbonate substrate of 120 mm in diameter (0.6 mm)/a protective layer/a recording film InSe(10 nm)/a protective layer (10 nm)/dye (60 nm). The laminated structure of layer L1 comprises a protective layer/a recording film InSe(16 nm)/a protective layer/a reflective film (80 nm) on a 120 mm diameter polycarbonate substrate (0.6 mm). The substrate of the medium has grooves with a depth of about 70 nm and a width of 0.615 μm, with a pitch of 1.23 μm.

The method of production of the medium is the same as the method described for Embodiment 1, as shown in FIGS. 3A to 3G. A dye used as a nonlinear optical material is formed by vapor deposition.

Hereinbelow, an experiment conducted with a light source having wavelength of 650 nm will be described.

The reflectance and transmittance of the produced disk measured by a spectrophotometer resulted in (Rc0, Ra0, Tc0, Ta0)=(0.3%, 0.3%, 91%, 77%) for the L0 single layer, and (Rc1, Ra1)=(22.2%, 3.5%) for the L1 single layer. Two layers were combined by the resin. The thickness of the resin layer, i.e., a spacer layer, was about 50 μm.

The drive reflectance of the dual-layered medium was (Rc0, Ra0, Rc1, Ra1)=(15.6%, 4.0%, 18.4%, 2.9%). The reflectance of the layer L0 is different from the reflectance observed by the spectrophotometer because the optical property of the dye changes due to the focusing of the light spot on the layer L0. From the calculation, the absorption of the dye with the above-described L structure with respect to light having a 650 nm wavelength was close to 0%. However, the optical property of the dye still changes. The reason for this is that the recording film absorbs light and transfers heat to the dye. In the experiment, when the thickness of the upper protective layer exceeded 50 nm, the change in the optical property became significantly small.

Recording was applied to the medium. By using an 8–16 modulation code, a random mark was recorded by a shortest mark length of 0.42 μm and with a linear velocity of 8.2 m/s. At the layer L0, the jitter was 8.2% for the first recording, and 8.6% after overwriting 1000 times; and, at the layer L1, the jitter was 7.5% for the first recording, and 8.0% after overwriting 1000 times.

Embodiment 3

As a layer 104 in FIG. 1, garnet was used. The specific material used was yttrium ion garnet (YIG) having Ga doped therein, and a film thereof was formed by sputtering. The laminated structure of the layer L0 comprised a polycarbonate substrate of 120 mm in diameter (90 μm)/a protective layer/a recording film InSe(14 nm)/a protective layer/garnet (15 nm). The laminated structure of the layer L1 comprised a protective layer/a recording film InSe(16 nm)/a protective layer/a reflective film (80 nm) on a 120 mm diameter polycarbonate substrate (1.1 mm). The substrate of the medium was provided with grooves with a depth of about 25 nm and a width of 0.16 μm, with a pitch of 0.32 μm.

The method of production of the medium is the same as the method shown in FIGS. 3A to 3G. Garnet is sputtered in a 100% Ar atmosphere (except for remnant gases).

Hereinbelow, an experiment conducted with a light source having a wavelength of 400 nm for recording on the groove, will be described.

The reflectance and transmittance of the produced disk, when measured by a spectrophotometer, resulted in (Rc0, Ra0, Tc0, Ta0)=(4.1%, 10.7%, 76.3%, 59.4%) for the L0 single layer, and (Rc1, Ra1)=(34.3%, 8.9%) for the L1 single layer. The thickness of the spacer layer was about 25 μm.

The drive reflectance of the dual-layered medium was (Rc0, Ra0, Rc1, Ra1)=(16.3%, 1.3%, 16.8%, 4.4%). By using an 8–16 modulation code, a random mark was recorded with a shortest mark length of 0.19 μm and a linear velocity of 6 m/s. At the layer L0, the jitter is 7.8% for the first recording, and 8.4% after overwriting 1000 times; and, at the layer L1, the jitter was 9.0% for the first recording, and 9.5% after overwriting 1000 times.

Embodiment 4

As a layer 104 in FIG. 1, ZnMnTe, one of the magnetic semiconductor materials, was used, and a triple-layered rewritable medium was formed. The laminated structure of the layer L0 comprised a polycarbonate substrate of 120 mm in diameter (90 μm)/a protective layer/a recording film InSe (10 nm)/a protective layer/ZnMnTe (10 nm). The laminated structure of the layer L1 comprised a protective layer/a recording film InSe(10 nm)/a protective layer/ZnMnTe (10 nm). The laminated structure of the layer L1 comprised a protective layer/a reflective film (80 nm) on a 120-mm-diameter polycarbonate substrate (1.1 mm). The substrate of the medium was an In Groove substrate having grooves with a depth of about 25 nm and a width of 0.16 μm, with a pitch of 0.32 μm.

Figure 5:
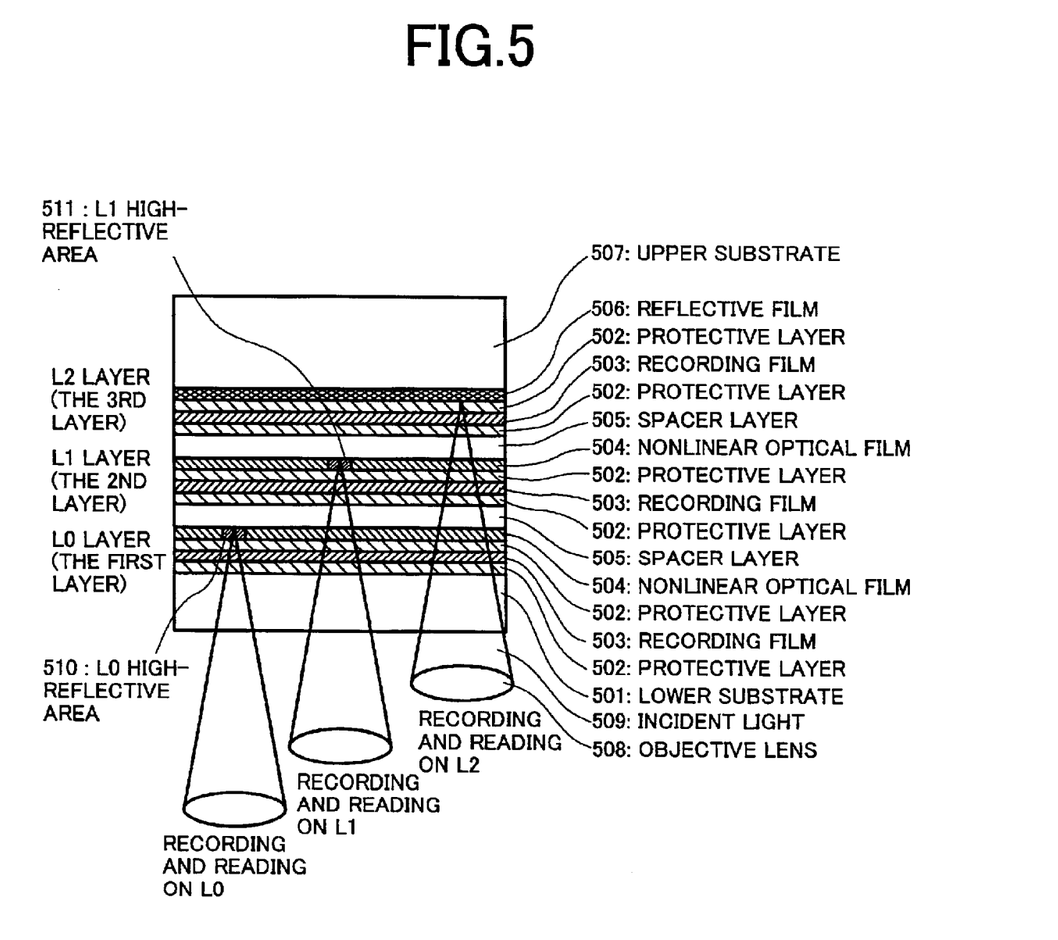
FIG. 5 is a diagram illustrating the structure of a triple-layered disk according to the present invention.

The medium, which is triple-layered, has a structure as shown in FIG. 5. The method of production of the medium is the same as the method shown in FIGS. 3A to 3G, except that the method steps shown in FIGS. 3C to 3E are repeated after the method step shown in FIG. 3E. ZnMnTe is sputtered in a 100% Ar atmosphere (except for remnant gases).

Hereinbelow, an experiment conducted with a light source having a wavelength of 400 nm will be described.

The reflectance and transmittance of the produced disk measured by a spectrophotometer resulted in (Rc0, Ra0, Tc0, Ta0)=(2.4%, 6.6%, 82.8%, 67.1%) for the L0 single layer, (Rc1, Ra1, Tc0, Ta0)=(1.4%, 3.6%, 82.8%, 67.5%) for the L1 single layer, and (Rc2, Ra2)=(23%, 1.5%) for the L2 single layer. The thickness of a spacer layer was about 20 μm.

The drive reflectance of the dual-layered medium was (Rc0, Ra0, Rc1, Ra1, Rc2, Ra2)=(10.7%, 1.8%, 10.8%, 3.2%, 10.8%, 0.7%). By using an 8–16 modulation code, random marks were recorded with a shortest mark length of 0.19 μm and a linear velocity of 6 m/s. Jitter was 9.0% for the layer L0, 9.5% for the layer L1, and 8.8% for the layer L2 for the first recording, and 10.1% for the layer L0, 10.8% for the layer L1, and 9.9% for the layer L2 after overwriting 1000 times. The jitter obtained herein is a little too high for practical use. By applying PRML (Partial Response Most Likely) as the signal process for reading, the data error rate can be reduced to about $2 \times 10^{-15}$.

What is claimed is:

1. An information recording medium, comprising:
    a substrate; and
    n recording layers provided on the substrate for recording information (where n is an integer of 2 or more), the n recording layers including both a focus $i^{th}$ layer (where i is an integer equal to or larger than 1 and yet equal to or smaller than n−1) useable as a focusing target to access an $i^{th}$ recording layer of the n recording layers, and an other focus $j^{th}$ layer (where j is an integer that is equal to or larger than 2 while equal to or smaller than n, and not i) useable as a focusing target to access a $j^{th}$ recording layer of the n recording layers which is deeper in the substrate relative to a predetermined light-incident side of the substrate than the $i^{th}$ recording layer;
    wherein the focus ith layer is selectably-transmissive responsive to focusing;
    wherein whenever light is focused substantially on the other focus $j^{th}$ layer, a transmittance $T_j$ of the focus $i^{th}$ layer is substantially transmissive satisfying the expression:

$$\prod_{i=1}^{j-i} T_i^2 \geq \frac{n-j+1}{n}$$

to allow the light to substantially pass therethrough to allow access to the jth recording layer; and
    wherein whenever light is focused substantially on the focus $i^{th}$ layer, the transmittance $T_j$ of the focus $i^{th}$ layer changes so that the focus $i^{th}$ layer becomes more reflective to allow access to the $i^{th}$ recording layer.

2. An information recording medium according to claim 1, wherein the focus $i^{th}$ layer is a nonlinear optical layer that changes transmittance depending on the focusing light.

3. An information recording medium according to claim 2, wherein the transmittance of the nonlinear optical layer changed by the focused light returns to an original value during one disk revolution.

4. An information recording medium according to claim 2, wherein the nonlinear optical layer is formed of a thermochromic material.

5. An information recording medium according to claim 4, wherein the thermochromic material is a triphernylmethane dye.

6. An information recording medium according to claim 2, wherein the nonlinear optical layer is a layer containing at least one of oxide of Ti, V, Cr, Mn, Fe, Co, Ni, Cu.

7. An information recording medium according to claim 6, wherein the oxide is in contact with a metal or a semiconductor.

8. An information recording medium according to claim 2, wherein the nonlinear optical layer has a laminated structure having a first layer containing at least one of oxide of Ti, V, Cr, Mn, Fe, Co, Ni, Cu, and a second layer of metal or semiconductor.

9. An information recording medium according to claim 7, wherein Fermi energy obtained by changing an optical property of the oxide of Ti, V, Cr, Mn, Fe, Co, Ni, or Cu by light irradiation is higher than Fermi energy of the metal or the semiconductor.

10. An information recording medium according to claim 2 wherein the nonlinear optical layer is a magnetic material.

11. An information recording medium according to claim 10, wherein the magnetic material contains garnet.

12. An information recording medium according to claim 10, wherein the magnetic material is a magnetic semiconductor.

13. An information recording medium according to claim 12, wherein the magnetic semiconductor contains Mn.

14. An information recording medium according to claim 13, wherein the magnetic semiconductor containing Mn contains at least one of O, S, Se, or Te.

15. An information recording medium according to claim 12, wherein the magnetic semiconductor contains at least one of Cd, Zn, Hg, or Pb.

16. An information recording medium according to claim 2, wherein a metal film or a semiconductor film is provided between the recording film and the nonlinear film, and a thickness of the metal film or the semiconductor film is equal to or more than 0 nm and equal to or less than 50 nm.

17. An optical information recording medium, comprising: a substrate, a first recording film, and a second recording film in a sequence from a light-incident side, wherein a nonlinear film is provided between the substrate and the second recording film, the nonlinear film having reflectance higher than transmittance whenever light focuses thereon, while having transmittance higher than reflectance whenever the light does not focus thereon.

18. An optical information recording medium according to claim 17, wherein the nonlinear film is placed between the first recording film and the second recording film.

19. An information recording medium, comprising:
a substrate;
a plurality of recording layers, at least one recording layer of which has a focusing-responsive selectably-transmissive layer associated therewith;
  wherein whenever light is NOT focused substantially on the selectably-transmissive layer, the selectably-transmissive layer is substantially transmissive to allow the light to substantially pass therethrough to allow access to a recording layer other than the at least one recording layer; and
  wherein whenever light IS focused substantially on the selectably-transmissive layer, the transmittance of the selectably-transmissive layer changes so that the selectably-transmissive layer becomes more reflective to allow access to the at least one recording layer.

* * * * *